J. BOCK.
PROCESS FOR PRODUCING LARGE WELL FORMED CRYSTALS FROM SOLUTIONS OF DIFFERENT KINDS.
APPLICATION FILED MAY 13, 1908.
984,645. Patented Feb. 21, 1911.
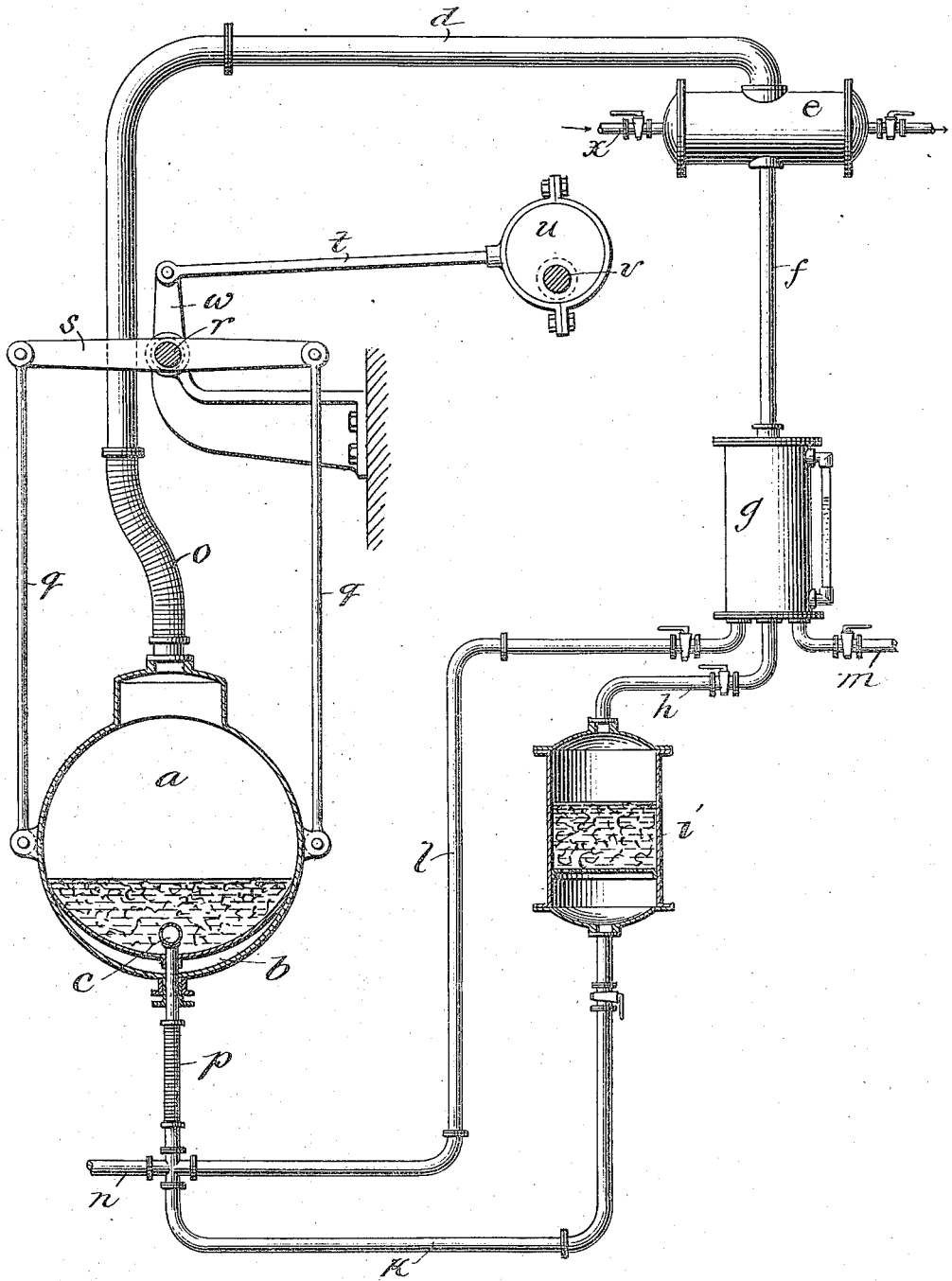

UNITED STATES PATENT OFFICE.

JOHANNES BOCK, OF RADEBEUL, NEAR DRESDEN, GERMANY.

PROCESS FOR PRODUCING LARGE WELL-FORMED CRYSTALS FROM SOLUTIONS OF DIFFERENT KINDS.

984,645.  Specification of Letters Patent.  Patented Feb. 21, 1911.

Application filed May 13, 1908. Serial No. 432,692.

To all whom it may concern:

Be it known that I, JOHANNES BOCK, chemist, a subject of the German Emperor, residing at 29 Bennostrasse, Radebeul, near Dresden, Germany, have invented certain new and useful Improvements in Processes for Producing Large Well-Formed Crystals from Solutions of Different Kinds; and I do hereby declare the following to be a full, clear, and exact description of the invention, such as will enable others skilled in the art to which it appertains to make and use the same.

It is well known that for the production of well formed crystals from a solution a certain overconcentration and agitation of the crystallizing solution is necessary. The overconcentration is essential in order that the separation of the substance from the solvent can take place, and the agitation is effected in order that new portions of the supersaturated crystallizing solution may come into contact with the crystals present, whereby a continuous and uniformly progressive enlargement of the crystals is made possible, because then the material separating out is taken up by the crystals without the formation of new crystals. In order, however, to make sure of this separation of the substance on the crystals present in the solution, the concentration must not exceed a certain predetermined limit, that is, the separation must not proceed so quickly that the crystals present, on which in a definite time only a definite quantity of the substance crystallizes, are not any longer in a condition to take up the substance which is being separated out; in such a case a new formation of very small crystals or slimy substances takes place, and thus the desired effect is lost. It has been sought to prevent this result by a cooling process, the crystallizing material being agitated on the one hand by suitable mechanism means such as a stirring apparatus, while on the other hand the cooling off is suitably regulated. The cooling must be effected so slowly that the substance which as a result of the cooling off of the mother liquor is separated out, will be taken up by the crystals. When the crystallization is carried out by evaporation, the new formation of small crystals is prevented by effecting the evaporation very slowly, with the addition of new solution at long intervals.

Heretofore the regulation of the crystallization by the known means and apparatus, to the desired extent, has been impossible. If the cooling off or the evaporation proceeds so fast that it does not correspond to the taking up capacity of the crystals present, the separation of new crystals takes place immediately. The desired enlargement of the first crystals does not then occur and the entire operation becomes useless. After the dissolving of the crystals, the crystallizing operation must be started again at the beginning. It is necessary, therefore, in effecting the crystallizing out of solutions, especially when large crystals are to be formed, to proceed in such a way that the crystallization is maintained far under the taking up capacity of the crystals present, wherefore if the crystallization be produced by evaporation, (which heretofore, moreover, has only been employed for the production of small crystals), the hot vapor of the heating body is used in such small quantity that the slow removal of the solvent is accomplished. This vaporized solvent is usually condensed, in the vacuum process, in a jet condenser, and runs away with the cooling water, which is conducted to such condenser. There has therefore been, heretofore, no means for effecting the crystallization by evaporation, in such a manner that the progressive separation of the substance takes place uniformly in a desired quantity, which quantity can be altered according to the wish of the operator. One has not been in a position to hasten the crystallization and thereby effect the growing of only the crystals at hand; and still less has any means been known to carry the crystallization up to the optimum of the taking up capacity of the crystals which are at hand when the operation is commenced.

The present invention has for its object the growth of well formed individual crystals up to a considerable size, by the evaporation process, in such a way that the crystallizing of the substance is so regulated that in a definite time unit a desired and known quantity of substance crystallizes out, this quantity being alterable as desired, and finally so that the crystallization is regulated to correspond with the taking up capacity of the crystals present, in order, therefore, to reach the optimum of such taking up capacity. The invention also aims to create or influence the crystallization conditions themselves advantageously.

It is known that the formation of vapor in the crystallizing solution itself is a very appropriate means of effecting the agitation which is necessary for the crystallization of the material in solution. This means is therefore utilized in carrying out my invention. However, in accordance with this invention the vapor is condensed in a suitable condenser, preferably a surface condenser, and the condensate, if necessary, is then wholly or in part conducted back again to the solution. In this manner it is possible to make the agitation in the mass as great as desired, without thereby removing from the crystallizing solution more of the solvent than corresponds to the quantity of substance which the crystals can take up. It is therefore possible to evaporate the solution quickly and far above the degree which has heretofore been permitted, for that quantity of solvent which is vaporized too quickly is led back into the solution, and only so much of the entire condensate is separated out as corresponds to the quantity of substance which the crystals can take up. In other words, one is in a position, with this procedure, to initiate and maintain a definite and desired concentration in the solution in spite of a very powerful evaporation.

As the quantity of substance present in the solution at any given time is known, it can be readily determined how much substance in a certain time unit can be taken up by the crystals present, and hence through the removal of a corresponding quantity of condensate it is possible also to accomplish the desired crystallization on the crystals of a definite quantity of such substance. It is therefore possible, by observation, to raise the separation of the substance and its crystallization on the initial crystals to the optimum of the taking up capacity of the latter, without danger of bringing about a new formation of crystals.

The improved method also accomplishes a regulation of the temperature with a view to creating the most favorable crystallization conditions. I have found that the crystallization of well formed crystals, viz., the growth of the same, is effected most favorably and most rapidly at a definite temperature. On the one hand there comes into question the viscosity of the solution, which tends to prevent crystallization and whose influence is augmented at definite temperatures. On the other hand, the movability of the molecules, which plays a certain part in the crystallization, is likewise influenced by the temperature, and therefore at a predetermined temperature, which varies with different substances, the most favorable conditions for the crystallization, and therefore for the building of large well formed crystals, can be obtained. The maintenance of a definite temperature in crystallizing by evaporation is necessary, moreover, with such substances as crystallize out of their solutions at different temperatures with different contents of water. Again, the temperature of the solution plays a part in the recovery of the material as it determines the different solution conditions and therefore the evaporation crystallization should be conducted at that temperature at which the best recovery, with the formation of large crystals, is guaranteed. As the crystallization is accomplished by evaporation in accordance with this invention, that crystallization temperature is selected as evaporating temperature which permits the production of good, well formed crystals most favorably. In order now to make the evaporation temperature correspond to the best crystallization temperature, in carrying out the crystallization by evaporation of the solvent, with the regulation of the rapidity with which the crystals grow, as previously described, the crystallization of the solution is effected under that pressure (vacuum, atmospheric pressure or overpressure), by which the desired temperature is produced in the solution. By altering the pressure the boiling temperature can be altered, as is well understood. It is therefore possible by the alteration and discontinuance of the pressure, which is maintained over the heated solution in the most uniform manner, to reach the optimum of the temperature for the growth of the crystals. Moreover, one is further in a position to maintain the necessary high crystallizing temperature in the crystallization of substances out of solutions which boil at low temperatures, e. g., ether, benzin and the like, by placing a corresponding overpressure on the cooking solution and thereby arriving at the desired high temperature which is necessary for a good crystallizing effect.

As previously explained, the condensate of the vaporized solvent may be either wholly or partially returned to the solution, so much of the condensate being removed as corresponds to the quantity of substance which the crystals can take up. In order to ascertain this quantity of condensate, the following procedure is necessary:—By experiment it is first ascertained what quantity of the substance the crystals which are to be grown can take up in a certain time unit at the necessary temperature or any temperature which is being maintained. It is also determined what quantity of the substance is soluble in a definite quantity of the solvent (for example one liter), at this temperature. It is then determined from this calculation what quantity of solvent can be conducted off in the time unit without, on the one hand, the formation of new crystals, and, on the other, so much of the solvent must be removed, nevertheless, as the crystals are in a position to take up. If more solvent is evaporated out of the solution than corresponds to the quantity of substance which will grow on the crystals, the surplus quantity of condensate must be returned. This is effected by recovering the condensate, measuring the quantity of the same, carrying off the calculated quantity, and conducting back to the solution the remaining part. If this procedure is followed one is even in a position to so control the rapidity of the evaporation of the solvent by the regulation of the heating medium, that only so much of the solvent will be vaporized as corresponds to the quantity of substance which will grow on the crystals. In this case it is especially recommended that the agitation of the solution be augmented by a rocking or shaking movement of the apparatus or the stirring of the solution by means of stirrers or the like.

As after a certain time a considerable part of the substance present in the mother liquor is crystallized out, it is necessary to add new substance to such liquor in order that crystals of the largest size may be grown. According to the present process this is effected by dissolving the additional substance in that part of the condensate which flows back to the solution. As it is known by determining the quantity of condensate, how much of the substance has crystallized out, it is possible to determine exactly the amount of the substance which is to be supplied to the solution in order to correspond with the rapidity with which the substance is taken up by the crystals. Quantities of substance which have been measured or weighed or otherwise determined can be dissolved in the condensate, or a definite part of the condensate can be run through a quantity of the substance in order to form in this way a solution of the feeding substance and bring it into the crystallizing solution. Obviously a corresponding quantity of the same solvent from another source may be used instead of returning the condensate. This procedure is adopted mainly if such substances are present in the solvent as are volatilized and condensed out of the solution, in which case, impurities would be present in the condensate. In this event, new pure solvent is added in order that the collection and increase of impurities in the mother liquor is prevented.

Instead of dissolving the feeding substance in the condensate, fresh feeding solution can be introduced into the crystallizing solution in order that the growth of the crystals can be carried on as long as desired. In this case also must the growth of the crystals correspond to the maximum rapidity with which they can be grown, as explained, and a definite quantity of the substance must be separated out on the crystals in the time unit, for which reason such a quantity of solvent must be removed from the condensate as corresponds to that brought into the apparatus in the feeding solution. As a consequence, the solvent vaporized out of the crystallizing mass as condensate is either measured or weighed, and in the same time unit the same quantity of solvent is led into the crystallizing apparatus as that in which is soluble the quantity of substance which the crystals can take up in the time unit. Or, a measured quantity of condensate is taken out of circulation, and correspondingly a like quantity of solvent with the substance dissolved therein can be added. By this process a perfectly continuous and automatic cycle of operations is provided.

The following examples will illustrate several modes of procedure falling within the general process:—In a crystallizing apparatus which is connected with a surface condenser and an air pump, 5 kilograms, say, of crystals are introduced, and from 6 to 8 kilograms of concentrated solution are added thereto. The solution is then evaporated by heating the apparatus, the vaporized solvent being condensed in the surface condenser, and the so formed condensate is then taken up in part in a measuring receptacle, the other part being returned to the apparatus. It has been previously determined, for example, that the quantity of crystals introduced into the apparatus can take up in an hour about 3% of its weight, viz., 150 gr. of the substance. In order to form this quantity hourly on the crystals already present, such a quantity of substance is dissolved in water, e. g., 300 gr. of water, and this feeding solution is continuously or intermittently introduced into the apparatus during an hour. At the same time 300 gr. of condensate are collected in the measuring receptacle and thus taken out of circulation, while the remaining part of the condensate is returned to the apparatus. As in an hour 150 gr. of substance and 300 gr. of water are fed into the apparatus, while 300 gr. of water are led off as condensate, the 150 gr. of substance will crystallize on the crystals present.

The process can also be carried through in such a way that by regulating the heating of the apparatus only 300 gr. of condensate are produced, measured and carried off. In this case the heating is regulated by measuring the condensate. The process can also be carried out without the regulation of the heating but with measuring and carrying off of the entire condensate, a like quantity of solvent being led into the apparatus in the feeding solution at the same time. Of course it is to be understood that a proper crystallization under these conditions takes place only when the quantity of additional substance in the feeding solution corresponds to that which the crystals present are able to take up in the time unit, as any surplus of such substance will form new crystals. In this connection, it should be remarked that as certain substances in crystallizing take up water of crystallization, this must be compensated for in feeding in solvent to maintain the concentration of the solution. In some cases, as intimated above, it is necessary to lead back all of the condensate to the apparatus, even when additional feeding substance is not fed into the latter or is suplied only intermittently. The first or initial crystals which are to be used can be generated in the known manner from the solution itself and will then be left to grow therein, or other crystals, crystal meal or crystal fragments may be introduced into the crystallizing solution.

The ordinary crystallizing apparatus and surface condensers may be used in carrying out the improved method, the determination of the quantity of condensate being ascertained by an appropriate measuring receptacle or a suitable weighing apparatus.

In the drawing, I have illustrated schematically one form of apparatus for carrying out the method, but it is to be understood that the particular form of apparatus is entirely immaterial to the invention.

Referring to the drawing $a$ indicates a closed crystallizing apparatus, which is provided with a double bottom $b$ to which heat is applied in a suitable manner, and $c$ is the inlet pipe for the solution to be crystallized and also for the condensate which is led back to the apparatus. The side walls of the apparatus are removable or provided with closable openings in order that the finished product may be removed from the apparatus. A surface condenser $e$ is connected with the crystallizer $a$ by means of a connection $d$ through which the vapors from the crystallizer are conducted to the condenser, wherein they are condensed. The condensate passes from the condenser $e$ through the pipe $f$ into the measuring receptacle $g$, wherein such condensate is measured. The condensate then passes from the measuring receptacle either wholly or partially through the pipe $h$ to the dissolving receptacle $i$ in which the fresh substance to be crystallized is introduced. In passing through the latter receptacle the condensate is saturated with the aforesaid substance and passes through the pipe $k$ into the crystallizer $a$. The pipe $l$ serves for conducting the condensate from the measuring receptacle directly to the crystallizer, the condensate to be removed or taken out of circulation being conducted away from said receptacle by means of the pipe $m$. The pipe $n$ serves to introduce fresh solution into the crystallizer. The connections are provided with shut-off cocks and air inlets, as indicated.

The vessel $a$ is preferably mounted to swing upon arms $q$ in order that it may be agitated. The arms $q$ are hung loosely from the two ends of a rocking bar $s$ fixed to the rock shaft $r$ to which a rocking motion is imparted by the arm $w$. The arm $w$ is attached to the rock shaft $r$ and is itself actuated by a rod $t$ which is connected to the strap of an eccentric $u$ fixed upon a rotary shaft $v$. The rotation of the latter shaft imparts a reciprocating motion to the rod $t$, thereby oscillating the vessel $a$, and, in order to permit this oscillation, said vessel is connected with the upper and lower pipes by the flexible pipe sections $o$ and $p$.

The double bottom $b$ is preferably heated by circulating hot water in the same, which water may conveniently be passed through a preheater after leaving the apparatus, and thus brought to the desired temperature, whereupon it may be returned to the double bottom by means of a suitable pump.

The process can be carried out with any desired crystallizable substance, whether it be organic or inorganic in character.

What I claim is:—

1. A process of obtaining crystals from solutions, which comprises evaporating the solution at such a pressure as to produce the optimum crystallizing temperature, condensing the vapors given off from the solution, measuring the condensate, and maintaining the concentration of the solution as called for by the ratio between the rate of condensate formation and the rate of crystallization; substantially as described.

2. A process of obtaining crystals from solutions, which comprises evaporating the solution at an appropriate pressure, collecting the vaporized solvent as condensate, measuring such condensate, maintaining the concentration of the solution as called for by the ratio between the rate of condensate formation and the rate of crystallization, and adding additional solvent and crystallizable material in such proportions as not to disturb the fixed ratio of solvent and crystallizable material prevailing in the evaporating vessel; substantially as described.

3. A process of obtaining crystals from solutions, which comprises evaporating the solution at an appropriate pressure, withdrawing from the evaporating vessel, in a time unit, so much of the vaporized solvent, as condensate, as will dissolve to saturation the quantity of substance crystallized out in such a time unit, and adding solvent and crystallizable substance to the solution in such quantity and proportions as to maintain the existing concentration; substantially as described.

4. A process of obtaining crystals from solutions, which consists in evaporating the solvent of the solution at a predetermined pressure and temperature appropriate to the formation of the particular crystals desired, and returning so much of the evaporated solvent to the solution as shall maintain therein a fixed ratio between the amount of the solvent and of the crystallizable material; substantially as described.

5. A process of obtaining crystals from solutions, which consists in evaporating the solvent of the solution at a predetermined pressure and temperature appropriate to the formation of the particular crystals desired, returning so much of the evaporated solvent to the solution as shall maintain therein a fixed ratio between the amount of the solvent and of the crystallizable material, and supplying an additional quantity of solvent and crystallizable material in such proportions as not to disturb the said fixed ratio prevailing in the evaporating vessel, thereby making the operation continuous; substantially as described.

6. A process of obtaining crystals from solutions, which consists in evaporating the solution, recovering the vapors as condensate, and returning to the solution, during a unit of time, that part of the condensate in excess of the amount in which the material crystallized in such a time unit is soluble to saturation; substantially as described.

7. A process of growing crystals in solutions agitated by steam produced in the solution itself, which consists in condensing the evaporated solvent, dissolving in the condensed liquid the substance to be deposited on the crystals, and returning the resulting solution into the crystallizing solution; substantially as described.

8. A process of growing crystals in solutions, wherein the solution is agitated by generating vapor therefrom, and wherein the vaporized solvent is used to dissolve the substance to be grown on the crystals, whereupon the resulting solution is conducted back to the crystallizing solution; substantially as described.

9. A process for the recovery of large crystals from solutions, wherein the solution is evaporated at a temperature and pressure appropriate to the formation of the desired crystals, and wherein the vapors are recovered as condensate, the evaporation of the solution and its quantity with respect to the quantity of condensate being so regulated that the material separated out grows on the crystals present; substantially as described.

10. A process for the recovery of large crystals from solutions, wherein the solution is vaporized at an appropriate pressure, and the vapors are collected as condensate, and wherein the concentration is maintained by the addition of a feeding solution corresponding to the quantity of material separated out and the quantity of condensate collected; substantially as described.

11. A process for the recovery of large crystals from solutions, wherein the solution is vaporized at an appropriate pressure, and wherein the vapors are recovered as condensate, the concentration of the solution being regulated by conducting back to the solution that part of the condensate which exceeds the proportion between the substance separated out and the corresponding quantity of solvent; substantially as described.

12. A process for the recovery of crystals from solutions, wherein the solution is vaporized at an appropriate pressure, and wherein the vaporized solvent is condensed and removed, the concentration of the solution being regulated by conducting back to it a part of the condensate formed, and dissolving in such part of the condensate the additional quantities of substance to be crystallized; substantially as described.

In testimony whereof I have affixed my signature, in presence of two witnesses.

JOHANNES BOCK.

Witnesses:
WOLDEMAR HAUPT,
HENRY HASPER.